No. 739,699. PATENTED SEPT. 22, 1903.
M. McDONALD.
HARROW.
APPLICATION FILED JAN. 7, 1903.
NO MODEL.
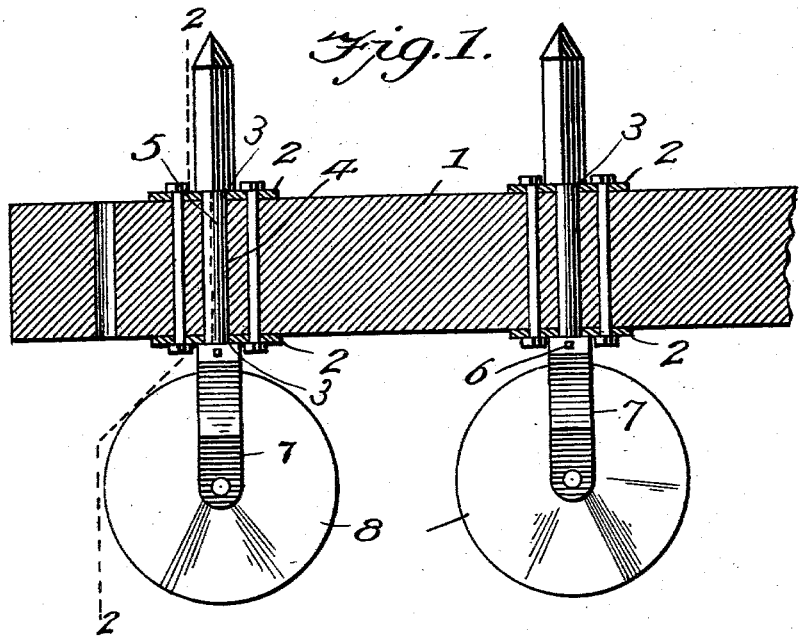
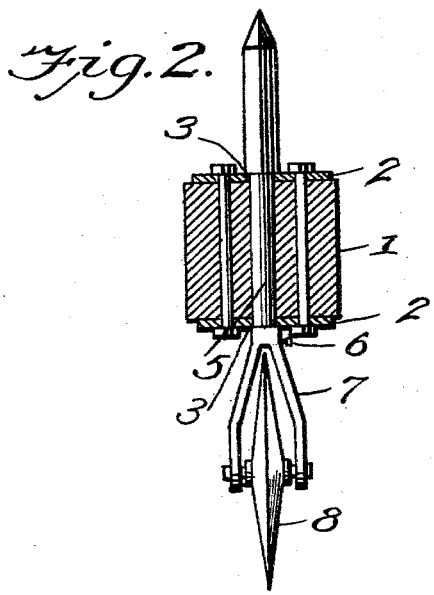
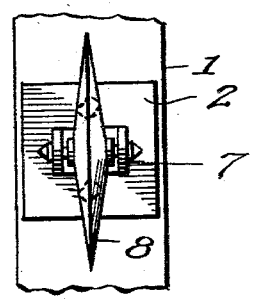
WITNESSES:
INVENTOR
Michael McDonald,
BY
Victor J. Evans
Attorney No. 739,699.

Patented September 22, 1903.

UNITED STATES PATENT OFFICE.

MICHAEL McDONALD, OF BENSON, MINNESOTA.

HARROW.

SPECIFICATION forming part of Letters Patent No. 739,699, dated September 22, 1903.

Application filed January 7, 1903. Serial No. 138,176. (No model.)

*To all whom it may concern:*

Be it known that I, MICHAEL MCDONALD, a citizen of the United States, residing at Benson, in the county of Swift and State of Minnesota, have invented new and useful Improvements in Harrows, of which the following is a specification.

My invention relates to new and useful improvements in harrows; and its object is to provide a combined disk and tooth harrow which is so constructed that both the teeth and disks are at all times in position for use and either can be employed any time desired.

With the above and other objects in view the invention consists in the further novel construction and combination of parts hereinafter more fully described and claimed, and illustrated in the accompanying drawings, showing the preferred form of my invention, and in which—

Figure 1 is a longitudinal section through a portion of the harrow and showing reversible teeth. Fig. 2 is a section on line 2 2, Fig. 1; and Fig. 3 is a bottom plan view of a tooth connected to a harrow-bar.

Referring to the figures by numerals of reference, 1 is a harrow-bar to opposite sides of which are secured plates 2, which are adapted to be bolted together, as illustrated in Figs. 1 and 2. An aperture 3 is formed in the center of each of these plates and registers with a passage 4, extending through bar 1. This passage and the apertures 3 receive a spindle 5, at one end of which is arranged a harrow-tooth 6, which is preferably integral with said spindle and which is adapted to bear upon the plate 2, adjacent thereto. A fork 7 is secured at the opposite end of the spindle 5 in any suitable manner, as by means of a set-screw 6, and between the ends thereof is journaled a harrow-disk 8 of any desired form.

When it is desired to employ the disk of the harrow for cutting new earth or for other purposes, it is merely necessary to turn the harrow in such position as to bring the disks underneath the same. The above operation is repeated when it is desired to utilize the teeth of the harrow.

Having thus described the invention, what is claimed as new is—

1. In a harrow, the combination with a bar having a revoluble spindle therein; of a harrow-tooth at one end of said spindle, and a rotary disk secured to the opposite end of the spindle.

2. In a harrow, the combination with a bar having a rotary spindle therein; of a harrow-tooth at one end of the spindle, a fork at the opposite end of the spindle, a harrow-disk journaled within said fork, and a bearing-plate for said tooth and fork.

In testimony whereof I affix my signature in presence of two witnesses.

MICHAEL McDONALD.

Witnesses:
A. D. ALDRICH,
C. P. ALDRICH.